United States Patent [19]

Childress

[11] Patent Number: 5,736,222

[45] Date of Patent: Apr. 7, 1998

[54] INTERLACED Z-PIN STRUCTURES

[75] Inventor: James J. Childress, Mercer Island, Wash.

[73] Assignee: The Boeing Company, Seattle, Wash.

[21] Appl. No.: 618,650

[22] Filed: Mar. 19, 1996

Related U.S. Application Data

[60] Provisional application No. 60/007,190 Nov. 1, 1995.

[51] Int. Cl.[6] ......................................... B32B 5/00
[52] U.S. Cl. .......................... 428/119; 428/99; 428/116; 428/318.4; 428/319.3
[58] Field of Search .......................... 428/119.71, 112, 428/311.51, 318.4, 319.3, 316.6, 310.5, 99, 116

[56] References Cited

U.S. PATENT DOCUMENTS

| | | |
|---|---|---|
| 4,489,123 | 12/1984 | Schijve et al. . |
| 4,808,461 | 2/1989 | Boyce et al. . |
| 5,041,321 | 8/1991 | Bendig . |
| 5,186,776 | 2/1993 | Boyce et al. . |
| 5,376,598 | 12/1994 | Preedy et al. . |
| 5,437,750 | 8/1995 | Rinse et al. ............................ 156/73.1 |
| 5,441,682 | 8/1995 | Baker . |
| 5,445,861 | 8/1995 | Newton et al. . |
| 5,466,506 | 11/1995 | Freitas et al. ........................... 428/105 |

FOREIGN PATENT DOCUMENTS

WO 95/03170   2/1995   WIPO .

*Primary Examiner*—Kathleen Choi
*Attorney, Agent, or Firm*—John C. Hammar

[57] ABSTRACT

Improved pin-reinforced sandwich structure ties the face sheets (typically on opposite sides of a foam core) together with a plurality of Z-pins that extend into each face sheet (through the core). The pins are arranged in a an interlaced configuration off-normal to provide crack resistance around fasteners for connecting the composite structure to other structural elements in aerospace applications.

14 Claims, 2 Drawing Sheets

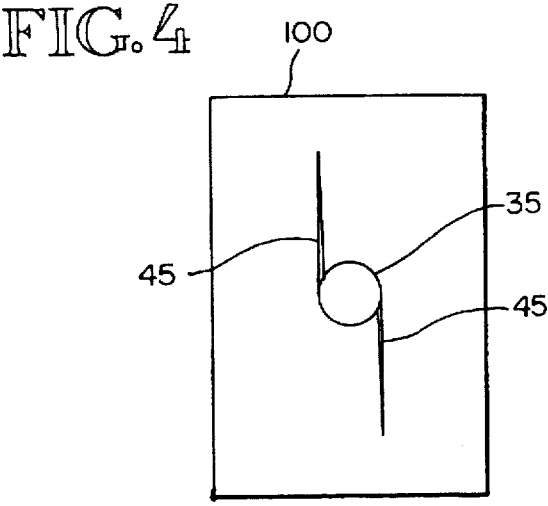
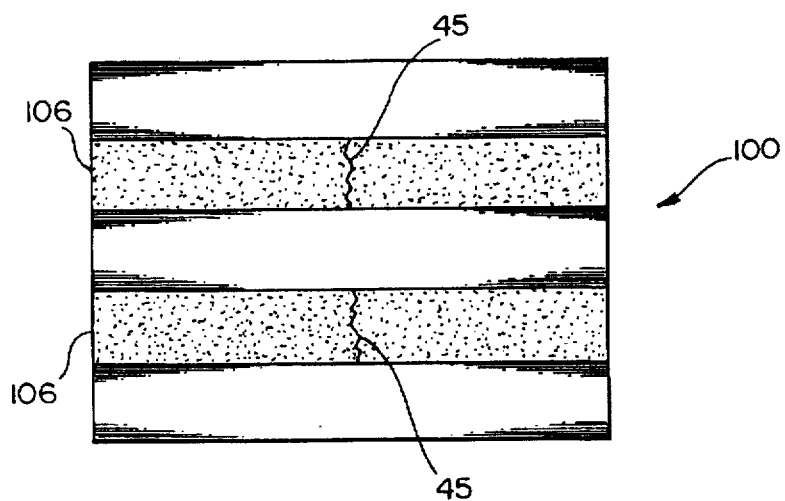
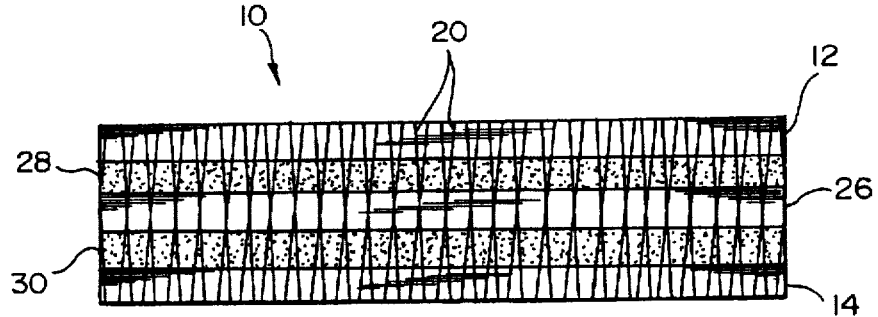

INTERLACED Z-PIN STRUCTURES

REFERENCE TO RELATED APPLICATION

This application claims benefit of U.S. Provisional Application 60/007190, entitled "Pin-Reinforced Sandwich Structure," filed Nov. 1, 1995.

TECHNICAL FIELD

The present invention relates to composite sandwich structures, and, more particularly, to Z-pinned structures having angled pins in interlaced configurations the resulting materials have better crack resistance, especially around stress concentrations, such as those arising such as those from bolts or fasteners.

BACKGROUND ART

Composite sandwich structures having resin matrix skins or face sheets adhered to a honeycomb or foam core are used extensively in aerospace, automotive, and marine applications for primary and secondary structure. The face sheets typically are organic matrix resin composites made from fiberglass, carbon, ceramic, or graphite reinforcing fibers and a thermosetting or thermoplastic matrix resin. Typically, the face sheets carry the applied loads, and the core transfers the load from one face sheet to the other or absorbs a portion of the applied load. In either case, it is important that all layers remain rigidly connected to one another. Noise suppression sandwich structure and sandwich structures for other applications are described in U.S. Pat. No. 5,445,861, which I incorporate by reference.

Keeping the face sheets adhered to the foam core is problematic. With reference to a foam core sandwich panel, the most common source of face sheet separation stems from the relatively weak adhesive bond between the face sheets and the foam core. That is, the pulloff strength of the face sheets in shear is low. Efforts to strengthen the bond have generally focused on improving the adhesive, but those efforts have had limited success.

Differences in the coefficient of thermal expansion (CTE) of the different material layers can also give rise to separation or delamination. As a result, as temperatures oscillate, the foam or face sheet may expand or contract more quickly than the adjoining layer. In addition to causing layer separation, CTE differences can significantly distort the shape of a structure, making it difficult to maintain overall dimensional stability.

Conventional sandwich structure optimizes the thickness of a structure to meet the weight and/or space limitations of its proposed application. Sandwich structures are desirable because they are usually lighter than solid metal or composite counterparts, but they may be undesirable if they must be larger or thicker to achieve the same structural performance. Providing pass-throughs (i.e. holes), which is relatively easy in a solid metal structure simply by cutting holes in the desired locations, is more difficult in a sandwich structure because holes may significantly reduce the load carrying capability of the overall structure.

Foster-Miller has been active in basic Z-pin research. U.S. Pat. No. 5,186,776 describes a technique for placing Z-pins in composite laminates. The matrix resin is heated and softened by ultrasonic energy transmitted through the ultrasonic needle, which, then, penetrate the laminate, moving the laminate fibers aside. The needle is withdrawn and a pin inserted or the pin is fed through the needle prior to its removal, in either case, thereby, inserting a Z-direction reinforcing fiber into the laminate. Cooling yields the pin reinforced composite. U.S. Pat. No. 4,808,461 describes a structure for localized reinforcement of composite structure. A body of thermally decomposable material that has substantially opposed surfaces is placed on the composite structure. A plurality of reinforcing elements (pins) captured in the body extend generally perpendicular to one body surface. A pressure plate (i.e., a caul plate) on the other opposed body surface drives the pins into the composite structure as the body is heated under pressure and decomposes. I incorporate U.S. Pat. Nos. 4,808,461 and 5,186,776 by reference.

A need exists for a method of forming a sandwich structure that (1) resists distortion and separation between layers, in particular, separation of the face sheets from the core; (2) maintains high structural integrity; (3) resists crack propagation; and (4) easily accommodates the removal of portions of foam core, as required by specific applications. The method should allow the structure to be easily manufactured and formed into a variety of shapes. In U.S. patent application Ser. No. 08/582,297 entitled "Pin-Reinforced Sandwich Structure," which I incorporate by reference, I described a method of forming a pin-reinforced foam core sandwich structure. I positioned first and second face sheets of uncured fiber-reinforced resin (i.e., prepreg or B-stage thermoset) on opposites side of a foam core. The core had at least one compressible sublayer and a plurality of Z-pins spanning the foam between the face sheets. I inserted the Z-pins into the face sheets during autoclave curing of the face sheet resin much like Foster-Miller, but without decomposing the foam. During autoclave curing, the pressure crushed the compressible sublayer and drove the Z-pins into one or both of the face sheets to form the pin-reinforced foam core sandwich structure. By removing at least some of the foam core by dissolving, eroding, melting, drilling, or the like to leave a gap between the face sheets, I converted the foam core sandwich structure to column core material.

As I described, the foam core generally includes a high density foam sublayer, and at least one low density foam sublayer that is crushable under the autoclave pressure. The preferred arrangement includes a first and second low density foam sublayer, one placed on each side of the high density sublayer. The plurality of Z-pins are placed throughout the foam core in a regular array normal to the surface or slightly off-normal at an areal density of about 0.375 to 1.50% or higher, as appropriate, extending from the outer surface of the first low density foam sublayer through to the outer surface of the second low density foam sublayer. Expressed another way concerning the arrangement of the pins, I might use 40–50 pin/in$^2$ or more. Preferably, the foam sublayers are formed of polyimide or polystyrene, the Z-pins are formed of stainless steel or graphite, and the face sheets are formed of partially cured thermosetting fiber/resin or thermoplastic composite materials.

Rorabaugh and Falcone suggested increasing pulloff strength by ordering of the Z-pins into regular ordered structural configurations or with resin fillets, as described in copending U.S. patent application Ser. No. 08/628,879 entitled "Highly Ordered Z-Pin Structures," which I incorporate by reference. They form resin fillets around the fiber/resin interfaces at the contact faces of the foam core by dimpling the foam to create a fillet pocket, or they arrange the pins in an ordered fashion such as a tetrahedral or a hat section configuration. The ordered pins provide a tie between the two skins and miniature structural support suited better for load transfer than normal or random off-normal (interlaced) or less ordered pin configurations.

In U.S. Pat. No. 08/235,594, Hoopingarner et al. describe a honeycomb core composite sandwich panel having a surrounding border element (i.e., a "closeout") made of rigid foam board. The two planar faces of the rigid foam board are embossed or scored with a pattern of indentations usually in the form of interlinked equilateral triangles. The indentations are sufficiently deep and sufficient in number to provide escape paths for volatiles generated inside the panel during curing and bonding of the resin in the face sheets to the honeycomb core and peripheral foam. The scoring prevents the development of excessive pressure between the face sheets in the honeycomb core that otherwise would interfere with the bonding. I incorporate this application by reference.

Fastening composite structure introduces stress concentrations that can pose problems, especially the formation of cracks in the "zero" plies where the resin is asked to hold the fibers together and to transfer load from the fastener to the fibers. I have learned that off-normal Z-pins reduce the likelihood of cracking in these zero plies in fastened composites or composite sandwich structure.

SUMMARY OF THE INVENTION

The present invention is a method to reduce cracking in fastened composite structure comprising the step of reinforcing the plies with off-normal (i.e. angled) interlaced Z-pins to provide support for the conventional X-Y fibers reinforcing and load paths from the X-Y fibers to the fastener. The invention also is the pin-reinforced composite having the interlaced pins.

BRIEF DESCRIPTION OF THE DRAWINGS

FIG. 3 is a schematic sectional view of pin-reinforced sandwich structure having interlaced Z-pins.

FIG. 4 is a top plan view of a typical crack emanating from a fastener in composite structure.

FIG. 5 is a sectional elevation of the crack of FIG. 4.

FIG. 6 is another sectional elevation of the composite structure of FIG. 4.

DETAILED DESCRIPTION OF A PREFERRED EMBODIMENT

Figure 1:
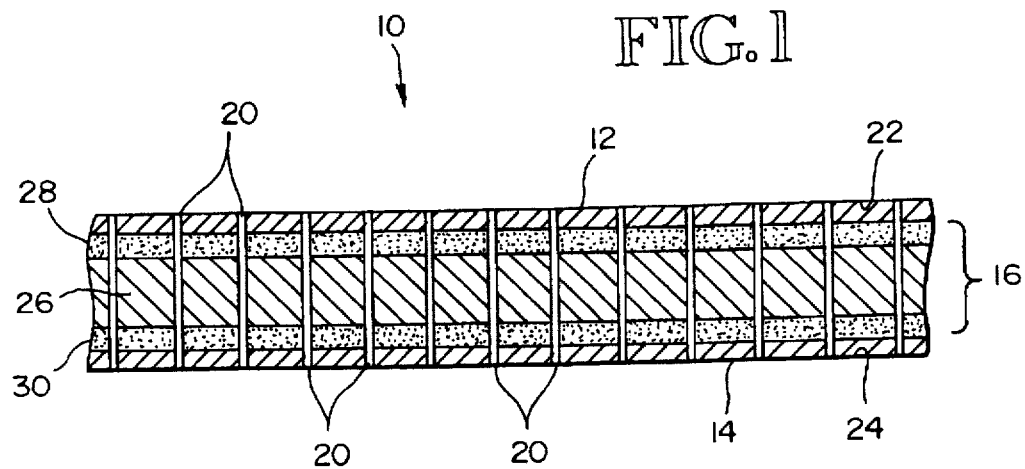
FIG. 1 is a schematic sectional view of a pin-reinforced sandwich structure.

FIG. 1 shows pin-reinforced foam core sandwich structure 10. Additional details on this structure are provided in my application to which I referred earlier, U.S. patent application Ser. No. 08/582,297, "Pin-Reinforced Sandwich Structure." The structure includes the foam core 16 and the plurality of Z-pins 20 that are oriented normal to the plane of the foam core 16, and that extend through the foam core 16 and face sheets 12, 14 from one outer surface 22 to the opposed outer surface 24. As shown, the pins are substantially parallel to both the X-Z and Y-Z planes In FIG. 3, the Z-pins 20 are angled (off-normal) to either the X-Z or Y-Z plane, or both. Angles even as great as 45° work with some materials. Interlaced Z-pins work particularly well for reinforcing face sheets 12, 14 around bolt holes 35 (FIG. 4), because they help to restrict the face sheets from cracking. The interlaced Z-pins are optimally inserted at both plus and minus angles so that the pins are skew to both the X-Z and Y-Z planes. The precise orientation of the Z-pins will vary according to the needs of the particular application. If the pin areal density is about 0.75% (with interlaced pins or with normal pins), for 20 mil diameter pins, the pins are about 0.125-inches apart. If the pins are angled, I discovered that they form tiny trusses between the skins to enhance performance of the panels. The length and spacing of the interlaced pins is a function of the truss angle, as those of ordinary skill will understand.

The first and second face sheets 12, 14 are positioned adjacent the foam core 16. I usually use a layer of adhesive to attach adjoining layers. I form the pin-reinforced foam core 16 using known methods (e.g., stitching or needling) or purchase it from companies such as Foster-Miller, Inc., in Waltham, Me. I can score the foam core according to the Hoopingarner method to provide channels for venting of volatiles during curing.

The core 16 generally is a closed cell foam that includes three sublayers: a high density central sublayer 26 and first and second low density, crushable foam sublayers 28, 30, one located on each side of the high density foam sublayer 26. While three layers are shown, it is to be understood that the foam core 16 may be composed of any number of sublayers depending on the particular application. For example, the foam core may be a single low density sublayer; or, it may be a stack of alternating low density and high density sublayers. The foam core 16 should be crushable during autoclave curing to permit the pins to extend into the face sheets. Low density polyimide (e.g., Rohacel™) or low density polystyrene (e.g., Styrofoam™) foams are the presently preferred low density sublayer materials, since they are easy to form and do not require extremely high temperatures or pressures to crush during autoclave curing. The low density sublayer may decompose at the autoclave temperatures.

If a high density sublayer 26 is included, it usually should be made of a material that will not crush during autoclave curing. Obviously, the precise temperatures and pressures to be used during autoclave curing will affect the selection of the material used to form the high density sublayer. Further considerations to be taken into account when selecting an appropriate high density sublayer material include whether the high density sublayer is to be removed after autoclave processing and the preferred method for removing it. Typically it is high density polystyrene or polyimide foam. It might be (i) syntactic foam having internal reinforcing spheres, (ii) a fiber-reinforced resin prepreg or composite, (iii) a fiberform or microform ceramic such as described in U.S. Pat. Nos. 5,376,598; 5,441,682; and 5,041,321 or in copending U.S. patent application Ser. Nos. 08/209,847 or 08/460,788, (iv) a metal foil, (v) a metal foil resin laminate of the type described in U.S. Pat. No. 4,489,123 or U.S. patent application Ser. No. 08/585,304 entitled "TITANIUM-POLYMER HYBRID LAMINATES", or (vi) a foam filled honeycomb core. The central sublayer 26 might also be a honeycomb core with the cells arranged normal to the plane of the face sheets. As Hoopingarner suggests, the core might be a combination of these alternatives arranged in the X-Y plane, like a central honeycomb core bordered by a foam closeout frame. If the high density sublayer is a prepreg or a composite, the product itself is a laminated composite. In such case, generally the resin in the face sheets would be the same as the resin in the high density sublayer.

The Z-pins 20 may be any suitably rigid material, e.g., stainless steel, titanium, copper, graphite, epoxy, composite, glass, carbon, etc. The Young's modules of elasticity for the Z-pins is generally greater than $10^7$. Additionally, the Z-pins may be barbed, where appropriate, to increase their holding strength in the face sheets.

The face sheets 12, 14 are, in the case of thermosets, preferably formed of a partially cured fiber-reinforced composite material. We can use thermosetting composite face sheets that are not significantly cured beyond B-stage (i.e., minimal cross-linking has occurred between resin molecules; the resin can still flow.) If composites are used as face sheets, the effect that the autoclave cure cycle will have on the face sheets needs to be considered to determine and, then, to follow the optimal temperature/pressure autoclave cure regime. The present invention probably will not work with fully cured thermosetting composite face sheets because they are too hard to force pins into.

Suitable reinforcing fibers include glass, graphite, arimide, ceramic, and the like. Suitable resins include epoxy, bismaleimide, polyimide, phenolic, or the like. (Virtually any thermoplastic or thermoset resin will suffice.)

Various procedures are available for laying up the composite face sheets. Since such procedures are generally known to those skilled in the arts they are not described here. Although thick, metal sheets do not work well as face sheets, I can use metal foil or metal foil/resin laminated composites. The metal foil in such cases might be welded to metallic Z-pins in the fashion described in my copending U.S. patent application Ser. No. 08/ 619,957 entitled "Composite/Metal Structural Joint with Welded Z-Pins."

FIG. 1 shows the structure after it has been cured under suitable heat and pressure; the pins extend through the face sheets. Autoclave curing involves placing a structure in a vacuum bag, performing controlled heating and pressurizing of the contents within the bag, and removing the contents following specific temperature/pressure cycle. The pressure produced during autoclave curing presses the face sheets 12, 14 toward one another and the heat cures the resin. The pressure causes the low density sublayer to crush, thus driving the Z-pins 20 into both face sheets 12, 14. The high density sublayer, if present, remains intact and acts as a support for holding the Z-pins 20 as they are pushed into the face sheets.

Those skilled in the autoclave curing art will understand that the particulars of the autoclave curing regime will vary according to the materials used and the results desired. The use of partially cured composite face sheets will obviously effect the time, and possibly the pressure, required to produce the desired result, i.e., drive the pins through the face sheets. As an example, I obtained acceptable results (i.e., produced usable structure) using:

1) partially cured 0.080 inch thick first and second face sheets formed of graphite fibers and 350° F. cure epoxy;
2) two 0.100 inch thick low density sublayers formed of 5 lbs/ft$^3$ density polyimide foam;
3) a 0.210 inch thick high density sublayer formed of 20 lbs/ft$^3$ density polyimide foam; and
4) a plurity of 0.020 inch diameter stainless steel Z-pins spaced 0.25 inches from each other.

I placed the structure in a vacuum pressure bag at ambient temperature (72° F.), pulled a vacuum on the bag; in a pressure oven, pressurized the contents of the oven to 20 psi, and heated the contents at 5° F./min until 350° F. I held the temperature and for 2 hours; before reducing the bag temperature 5° F./min until ambient. Then, I vented the pressure to ambient and removed the finished part from the vacuum bag. This process will crush the first and second low density layers, drive the pins through the face sheets, and finish curing the composite face sheets. Typically, autoclave curing includes raising the pressure after the cure temperature has been reached. For the above example, however, this added pressure was unnecessary, and, if used, might have crushed the 0.210 inch thick high density polyimide sublayer.

As a second example, I obtained acceptable results using the same components and autoclave curing steps recited above, except I substituted 250° F.-cure resin is 10 lbs/ft$^3$ polystyrene sublayer, 40 lbs/ft$^3$ polystyrene for the high density sublayer, and a maximum cure temperature of 250° F.

The thickness of the face sheets 12, 14 and foam core 16 may vary. I have obtained acceptable results using foam cores of between 0.125 and 1.25 inches thick. Exemplary face sheet thicknesses for a graphite/epoxy range between about 0.050 to 0.080 inches. Using small thicknesses for the face sheets has the advantage of requiring that the low density sublayer only crash over a corresponding small dimension to drive the Z-pins through the face sheets. Exemplary Z-pin thicknesses are between 0.010 to 0.030 inches in diameter, typically regularly spaced between 0.0625 to 0.25 inches from each other. The dimensions discussed can vary greatly depending on the application intended for the resulting structure, the materials used to form the structure, and the specific autoclave curing cycle.

Any Z-pins 20 that protrude beyond the outer surface of the face sheet may be shaved off flush with the surface using standard milling machines, e.g., planes, grinders, sanders, and the like. Preferably the pressurizing mechanism used by the autoclave curing system will include pressing surfaces that cover the entire outer surface of the face sheets. Using such all-covering pressing surfaces prohibits the Z-pins 20 from sticking out beyond the outer surface of the face sheets, and thus, eliminates the step of having to shave them off. The present invention also encompasses using an autoclave curing cycle that drives the Z-pins 20 only part way through the face sheet.

Figure 2:
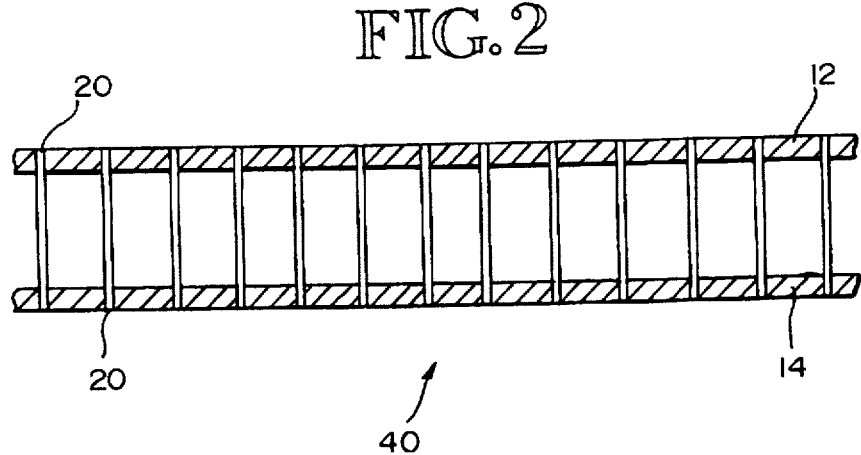
FIG. 2 is a schematic sectional view of Z-pinned column core structure.

For applications requiting a hollow space or gap between the face sheets 12, 14, the foam core 16 may be partially or fully removed from the sandwich structure to form a column core structure 40 (FIG. 2). The method of removal will depend upon the materials selected for the foam core 16. For example, I can dissolve the foam sublayers using a solvent, such as methylethyl ketone (MEK). Other methods to remove the sublayer include erosion, melting, acid digestion, thermal decomposition, drilling, laser cutting, or the like. FIG. 2 shows a cross-sectional view of a pin-reinforced foam core sandwich structure 10 after the foam core 16 has been entirely removed. Column core can have interfaced pins.

Pin-reinforced foam core sandwich structure has high structural integrity that resists deformation and face sheet separation by using a plurality of Z-pins to transfer loads between face sheets. The sandwich structure is easy to form and has a wide range of uses. The risk of face sheet separation due to variations in CTE between materials is greatly reduced, since the pins continuously hold the face sheets in proper alignment. The need to remove portions of the structure may be easily accommodated without compromising the structural integrity of the article, since the pins remain embedded in the face sheets even after sublayer removal.

The size and number of layers, their chemical composition, and the particulars of the autoclave curing regime will vary greatly from one application to another.

The foam core sandwich structure and column core structure may be used in a variety of structural aerospace applications. The column structure is particularly adapted for use in actively-cooled circuit boards, actively-cooled electronics racks, and anti-icing leading edge structures, where a heat transfer fluid is circulated in the gap between the outer face sheets.

Rorabaugh and Falcone increased pulloff strength by forming resin fillets around each fiber at the face sheet/core interface. The fillets form when the resin flows during cure by filling dimples formed into the foam around each pin. For best results, we believe that the face sheets should be resin-rich during layup so that fillet flow will not deplete the laminates. They used tetrahedral or hat section pin configurations to maximize pulloff and compressive strength. The primary difference between the tetrahedral and the hat section configuration is the lateral spacing of the pins, since in the hat section the angled pins simply are spaced further apart than in the tetrahedral configuration.

Interlaced Z-pins as shown in FIG. 3 help to provide load paths around bolts or fasteners 50 (FIG. 6) where stress is concentrated. FIGS. 4–6 illustrate the problem of cracking 45 around bolt holes 35. In FIG. 4, a composite 100 has a bolt hole 35 from which cracks 45 propagate. FIG. 5 shows a section through the composite 100 to illustrate that the cracks 45 initially are only in the zero plies 106 because, when the composite is pulled in the zero direction, only the resin matrix is available to hold the ply fibers together. With interlaced Z-pins, as shown in FIG. 3, the transverse angle of the pins relative to the zero plies imparts a tension load on the pins when the composite is pulled in the zero direction. As such, the interlaced pins transfer the load from the zero ply to other laminate plies and reduce the onset of tangential bolt hole cracking.

Interlaced Z-pins can be in random arrangement or in ordered arrangements. Rorabaugh and Falcone suggested, perhaps, the highest order with their hat section or tetrahedral configurations. I prefer to use a combination of angled pins where the angle varies in the structure. That is, for example, some pins may be at 30° while others are at 45°. I prefer the arrangement to place each pin skew to both the X-Z and Y-Z planes and seek an isotropic material having substantially the same pulloff strength in X-direction shear and Y-direction shear.

For purposes of this application, I use the term "off-normal" to mean that the pins are skew to both the X-Z and Y-Z planes.

I might change the density of pins or their ordering in different areas over the surface area of the completed part to obtain desired structural properties. For example, we might use Z-pins in the Hoopingarner closeouts but not in the honeycomb core regions or we might include Z-pins in regions where fasteners will be used but not in the remainder of the panel.

While I have described preferred embodiments, those skilled in the art will readily recognize alterations, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

I claim:

1. A pin-reinforced sandwich structure, comprising:
   (a) a core having opposed first and second surfaces defining a reference plane and a normal plane;
   (b) a first face sheet adjacent the first surface;
   (c) a second face sheet adjacent the second surface;
   (d) a plurality of pins inserted into and terminating in the first and second face second face sheets and extending through the core to form a pin-reinforced sandwich structure, wherein the pins form an interlaced Z-pin region having an interlaced, ordered configuration of pins having at least a portion of the pins off-normal to the reference plane;
   (e) a bore through the core and face sheets in the interlaced Z-pin region and
   (f) a fastener in the bore wherein the Z-pin region has an areal density of pins in the range from about 0.375–1.50%.

2. The structure of claim 1 wherein the face sheets are adhered to the core.

3. The structure of claim 1 wherein the core is organic matrix resin foam.

4. The structure of claim 1 wherein the face sheets are fiber-reinforced resin composites.

5. The structure of claim 1 wherein the pins are metal, graphite, glass, or carbon having a Young's modulus of at least about $10^7$.

6. A method for increasing crack resistance around fasteners in pin-reinforced composite structure as defined in claim 1, comprising the step of:
   ordering the pins off-normal into an interlaced configuration around the fastener to provide support for the fibers and load transfer paths.

7. The structure of claim 2 where the core is organic matrix resin foam.

8. The structure of claim 7 wherein the face sheets are fiber-reinforced resin composites.

9. The structure of claim 8 wherein the pins are metal, graphite, glass, or carbon having a Young's modulus of at least about $10^7$.

10. The structure of claim 1 wherein the fastener is immediately adjacent the bore.

11. The structure of claim 1 wherein the off-normal pins are angled up to about 45° with respect to the normal.

12. The structure of claim 1 wherein the off-normal pins are skew to both the reference plane and to a normal plane perpendicular to the reference plane.

13. A pin-reinforced sandwich structure, comprising:
   (a) a core having opposed first and second surfaces defining a reference plane and a normal plane;
   (b) a first face sheet adjacent the first surface;
   (c) a second face sheet adjacent the second surface;
   (d) a plurality of pins inserted into and terminating in the first and second face second face sheets and extending through the core to form a pin-reinforced sandwich structure, wherein the pins form an interlaced Z-pin region having an interlaced, ordered configuration of pins having at least a portion of the pins off-normal to the reference plane;
   (e) a bore through the core and face sheets in the interlaced Z-pin region and
   (f) a fastener in the bore, wherein:
      the face sheets are adhered to the core;
      the core is a foam or a honeycomb;
      the face sheets are fiber-reinforced resin composites; and
      the pins in the interlaced Z-pin region are at an areal density in the range from about 0.375–1.50% to provide resistance to crack growth around the bore by providing load paths through the pins from the fastener to the face sheets.

14. The structure of claim 13 wherein the core is honeycomb.

* * * * *